United States Patent [19]
Cadogan

[11] Patent Number: 5,089,749
[45] Date of Patent: Feb. 18, 1992

[54] METHOD AND APPARATUS FOR MEASURING OUTPUT OF A HEAT LAMP FOR AN OPTICAL TLD READER

[75] Inventor: Richard Cadogan, Fulton, Ill.

[73] Assignee: Commonwealth Edison Company, Chicago, Ill.

[21] Appl. No.: 647,448

[22] Filed: Jan. 28, 1991

[51] Int. Cl.⁵ .................. H05B 37/02; H01J 7/24; G01K 15/00
[52] U.S. Cl. ................... 315/151; 315/118; 315/309; 374/2; 324/403; 324/414; 250/252.1
[58] Field of Search .............. 315/151, 118, 309; 374/2; 324/403, 414; 250/252.1

[56] References Cited

U.S. PATENT DOCUMENTS

| | | | |
|---|---|---|---|
| 3,449,629 | 6/1969 | Wigert et al. | 315/151 |
| 3,962,586 | 6/1976 | Mayhugh et al. | 250/484 |
| 4,376,890 | 3/1983 | Engstrom et al. | 250/227.23 |
| 4,448,547 | 5/1984 | Wickersheim | 374/131 |
| 4,480,189 | 10/1984 | Miyake et al. | 250/337 |
| 4,745,273 | 5/1988 | Szabo et al. | 250/207 |
| 4,835,388 | 5/1989 | Bruml et al. | 250/337 |

OTHER PUBLICATIONS

9th Annual TLD International Symposium; Keystone, Colorado, Jun. 18-22, 1990.

Primary Examiner—Eugene R. LaRoche
Assistant Examiner—Michael B. Shingleton
Attorney, Agent, or Firm—S. T. Naumann; William A. Webb

[57] ABSTRACT

A method and apparatus for measuring and adjusting output of a heat lamp for an optical TLD reader includes an optical system which matches the optical system of the TLD reader, means for supporting a heat lamp to be calibrated, and an element plate having at least one heat absorbing substrate supported in alignment with the optical system. The heat lamp is electrically connected to a lamp driver circuit of the TLD reader, and a thermocouple is mounted in thermal contact with the heat absorbing substrate. In use, the lamp driver circuit of the TLD reader drives the heat lamp mounted in the calibration and adjusting device. This device monitors the signal generated by the thermocouple and displays this signal as a measured heat response curve. This measured heat response curve can be compared with a 'standard' or reference heat response curve to determine whether the lamp driver circuit has been adjusted properly for the heat lamp being tested, and to determine the nature of any required adjustments.

19 Claims, 3 Drawing Sheets

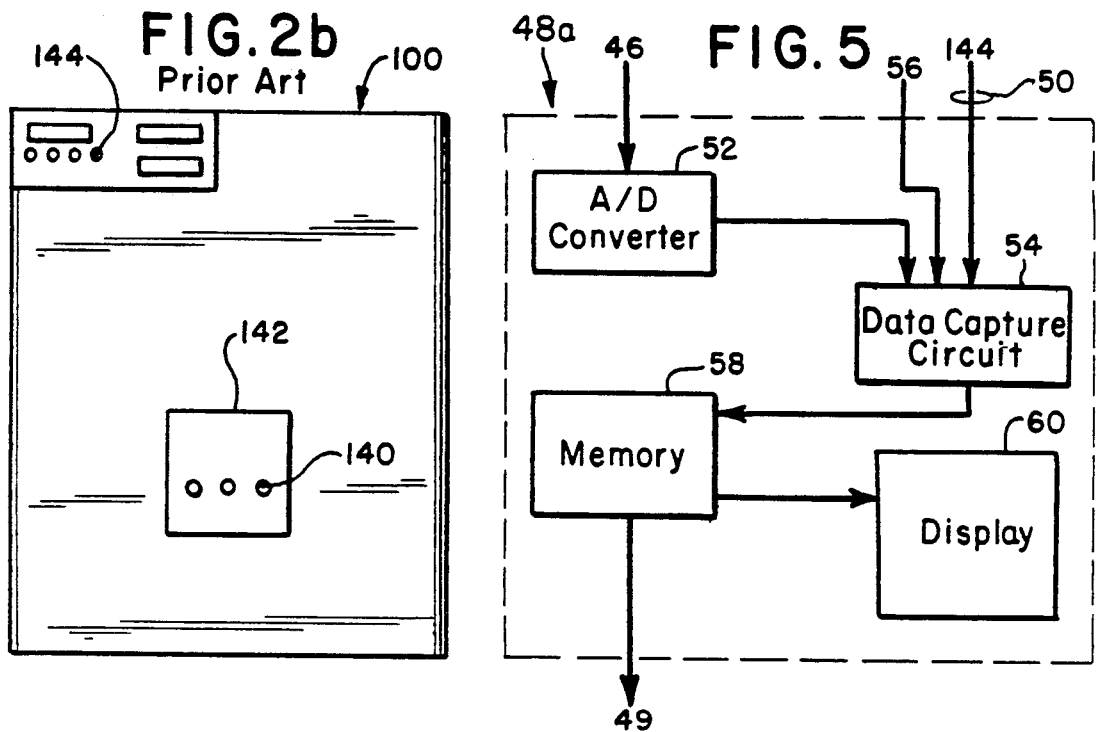
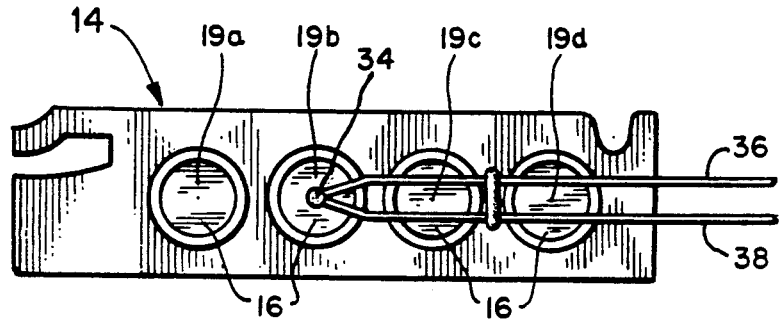
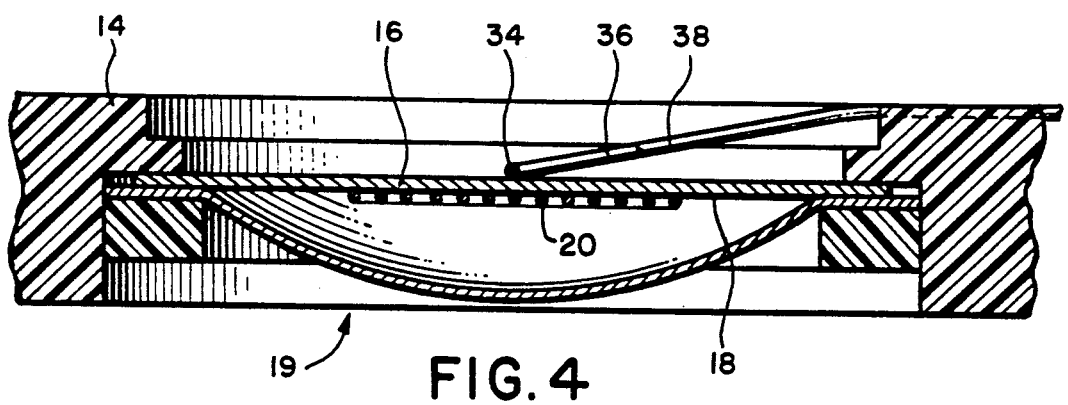

METHOD AND APPARATUS FOR MEASURING OUTPUT OF A HEAT LAMP FOR AN OPTICAL TLD READER

BACKGROUND OF INVENTION

This invention relates to a device and a method for accurately and quickly measuring the heat output of an electric heat lamp associated with an optical thermoluminescent dosimeter (TLD) reader.

Optical TLD readers are used in the nuclear power industry to measure radiation by using the infrared output of an electric lamp to heat a radiation badge coated with thermoluminescent (TL) phosphors. The badge is worn by personnel working in radiation areas. When the badge is exposed to radiation, electrons in the TL phosphors are energized to an excited state. When these exposed badges are heated in the TLD reader, energy stored in the phosphors is liberated in the form of photons as the electrons return to their ground state. These photons are then counted in the TLD reader and converted to a radiation measurement.

The preferred embodiment of this invention is used with a Panasonic TLD reader. This reader is adapted to read radiation badges containing two types of phosphors: calcium sulfate doped with thulium ($CaSO_4$:Tm) and lithium borate doped with copper ($Li_2BO_4O_7$:Cu). Other phosphors may be used depending on the application. It is a property of these phosphors that some electrons are trapped at relatively low energy levels and are released and return to their ground state within a relatively short period of time due to ambient temperature. This phenomenon is known as fading. Because the badges are read at varied times after irradiation, fading must be correctly accounted for at the time of badge reading to insure an accurate reading. Another property of these phosphors that must be accounted for during reading is the fact that at high temperatures the phosphors radiate in the infrared. This phenomenon is known as thermal noise and should be maintained at a relatively low level to insure an accurate radiation reading.

Proper temperature control during reading is critical to obtaining an accurate radiation reading. Too high a temperature can result in too much thermal noise as well as improper fading. Too low a temperature can result in improper fading. In either case, erroneous radiation readings may result.

To better understand this invention, it is helpful to understand the operation of an optical TLD reader. A typical reader contains the following elements: an optical heat source in the form of an electric lamp and a silicon filter; means for supporting a badge during reading; and means for collecting and counting photons from the badge and converting that count to a radiation reading. The collecting means generally includes a photomultiplier tube. The operator places an exposed badge in the reader with the phosphor coating facing toward the photomultiplier tube and away from the heat lamp such that the infrared output of the lamp will strike the rear of the substrate on which the phosphors are mounted. The heat source is specially designed for this application and comprises a convergence cone for focusing the output of the lamp and the silicon filter for transmitting infrared radiation onto the rear of the substrate.

To obtain an accurate radiation reading, the lamp is generally flashed twice. The lamp is generally flashed a third time to prepare the badge to be reused. The first flash, called a preheat flash, liberates electrons in low temperature traps. This preheat flash lasts for approximately 70 milliseconds (msec). Because of time delays inherent in heat transfer, phosphor temperature does not rise instantaneously but continues to rise for about 500 msec. At that point in time, the second reading flash liberates electrons in the high temperature traps which are used by the reader to measure radiation. The reading flash typically has a duration of approximately 100 msec. After a delay of approximately another 500 msec, the lamp is flashed a third time in an annealing or postheating flash. This flash is not required for radiation reading but prepares the TL elements for reuse. Overall, the temperature of the phosphors rises by about 300° C. in approximately 1.5 seconds.

The timing of the various flashes, as well as the length of these flashes and the heat output of the lamp, are critical for obtaining an accurate radiation reading. For instance, if too little heat is available during the preheat cycle, not all of the electrons in the low temperature traps will be liberated at that time but will be liberated during the reading flash. This may result in an elevated radiation reading. Similarly, too much heat may liberate electrons stored in the high temperature traps during the preheat cycle, resulting in an erroneously low radiation reading. Further, too much thermal noise may be generated during the reading cycle, resulting in an inaccurate reading. Too little heat during the annealing flash may not restore the phosphors for reuse, while too much heat may damage the substrate.

One method currently used to adjust heat lamp output is to analyze glow curves (light output measured as a function of phosphor temperature over time). The drawback of glow curve analysis is that it may take an undesirably long time, on the order of hours or even days, to adjust heat output of the lamp correctly. This is because badges must be irradiated and read to produce each glow curve. Then after voltage and/or timing adjustments have been made to adjust lamp temperature, new badges must be read until the glow curves look correct. This may take many reading cycles, and glow curve analysis is somewhat subjective. An example of a procedure for adjusting lamp output using glow curves can be found in Plato, P., "Heating Adjustments for the UD-710 Automatic TLD Reader" presented at the 9th Annual TLD International Symposium 253 (June 21, 1990).

Therefore, it is a primary object of the present invention to provide a device and a method for quickly and accurately adjusting the heat output of a lamp used in an optical TLD reader.

It is another object of this invention to quickly determine if such a lamp is faulty.

It is a further object of this invention to provide means for adjusting the heat output of a lamp for an optical TLD reader without requiring exposure of TL phosphors to radiation to make such adjustments.

SUMMARY OF INVENTION

This invention allows heat adjustments to be made to new lamps and allows the operability of lamps to be checked prior to installation in an optical TLD reader. The device of this invention is adapted to be used for adjusting the output of a heat lamp to be operated in an optical TLD reader having a lamp driver circuit, means for adjusting lamp voltage and means for adjusting on/off timing of the lamp.

The device of this invention comprises an element plate having at least one heat absorbing substrate, and supporting means for supporting the element plate. An optical system is attached to the supporting means and is configured to support a heat lamp and to direct light from the heat lamp onto the heat absorbing substrate. Means are provided for electrically connecting the heat lamp to a lamp driver circuit of an optical TLD reader of the type comprising means, separate from the supporting means, for supporting a radiation badge. A thermocouple is mounted in thermal contact with the heat absorbing substrate, and this thermocouple produces a first electrical signal related to the temperature of the substrate. Means are provided for capturing the first electrical signal, and means, responsive to a signal derived from the first electrical signal, are provided for processing information correlated with temperature of the substrate as a heat lamp calibration aid.

According to the method of this invention, an optical TLD reader is provided adapted to hold a first element plate comprising at least one first heat absorbing substrate, and the optical TLD reader comprises a lamp driver circuit and a first light collector. A heat lamp configured for use with the optical TLD is provided, along with a lamp calibration device of the type comprising a second element plate comprising at least one second heat absorbing substrate. This lamp calibration device further comprises means for supporting the second element plate and an optical system attached to the supporting means and configured to support the heat lamp and to direct light from the heat lamp onto the second element plate. The lamp calibration device also includes means for electrically connecting the heat lamp to the lamp driver circuit and a thermocouple mounted in thermal contact with the second heat absorbing substrate to produce a first electrical signal related to temperature of the second heat absorbing substrate. Then the heat lamp is mounted in the optical system of the lamp calibration device and the heat lamp is connected to the lamp driver circuit of the optical TLD reader. The lamp driver circuit is then used to drive the heat lamp while the first electrical signal is monitored to measure infrared output of the heat lamp. The lamp driver circuit is then adjusted if necessary to enhance correspondence between infrared output of the heat lamp as measured in the preceding step and a reference infrared output.

BRIEF DESCRIPTION OF DRAWINGS

FIG. 2b is a partial internal view of the prior art optical TLD reader of FIG. 2a.

FIG. 3 is a detailed view of the element plate of the device of FIG. 1.

FIG. 4 is a detailed view of one element of the element plate of FIG. 3, showing the attachment of the thermocouple.

FIG. 5 is a detailed block diagram of an oscilloscope included in the device of FIG. 1.

DETAILED DESCRIPTION OF THE PRESENTLY PREFERRED EMBODIMENT

Figure 1:
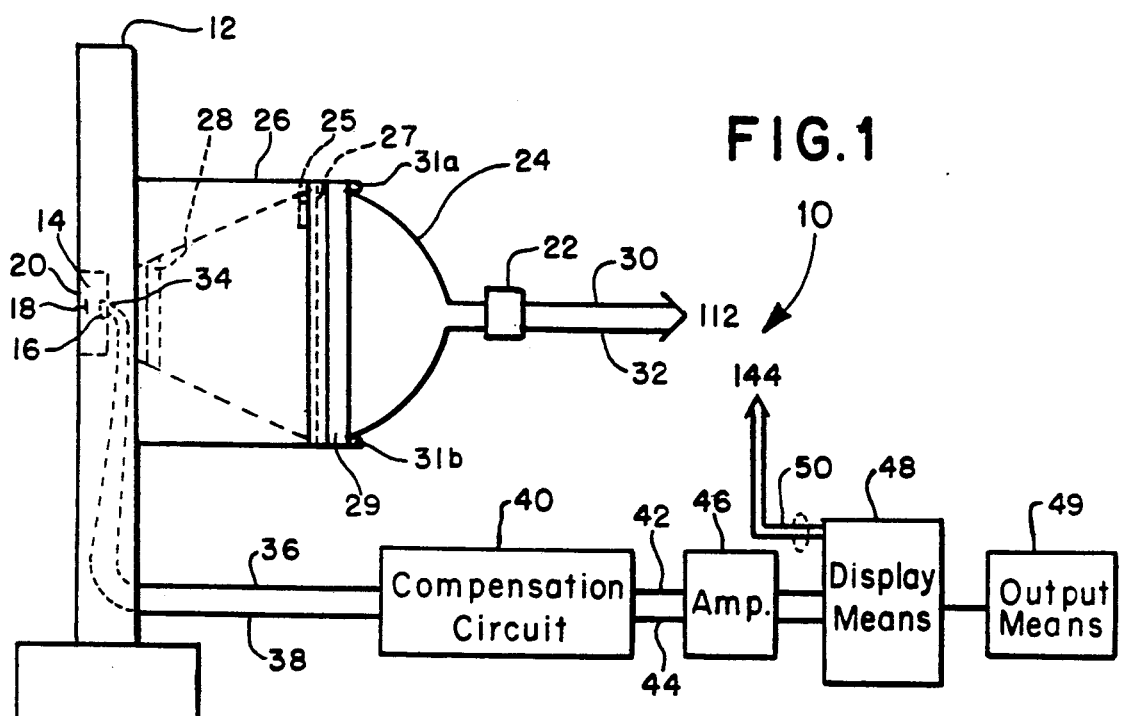
FIG. 1 is a right side view of the preferred embodiment of the calibrating and adjusting device of this invention.

FIG. 1 shows a device 10 for calibrating and adjusting heat lamps used in optical TLD readers. The calibrating and adjusting device 10 comprises a supporting means 12 which is constructed to hold in place a TL element plate 14 of the type read by optical TLD readers, as well as other components as described below.

As shown in FIGS. 3 and 4, the element plate 14 comprises at least one element 19. Each element has a first side having a heat absorbing substrate 16 and a second side 18 holding TL phosphors 20. The element plate 14 has four elements 19a–d. Multiple elements are not required for this invention but are used in this embodiment because the optical TLD reader of FIGS. 2a and 2b uses such element plates.

Returning to FIG. 1, a connecting means 22 is constructed to connect the heat lamp 24 to be tested to an electrical supply. The device 10 is disposed so that the heat lamp 24 to be tested will be located the same distance from the heat absorbing substrate 16 as an operating heat lamp 114 would be from the heat absorbing substrate of a radiation badge 109 when installed in an optical TLD reader 100 (Shown in FIGS. 2a and 2b).

Figure 2A:
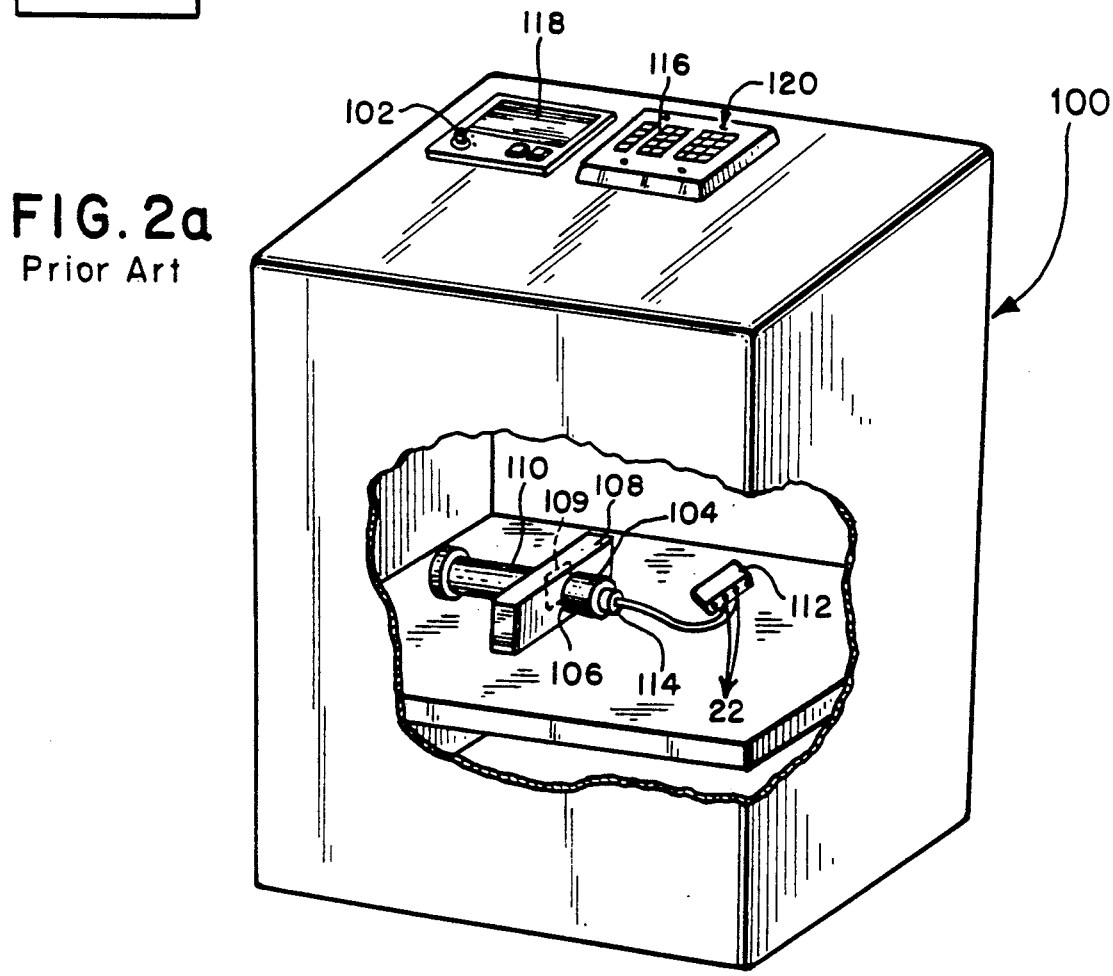
FIG. 2a is a partial front view of a prior art optical TLD reader.

The supporting means 12 also supports a convergence cone 26 and a silicon filter 28. The convergence cone 26 and silicon filter 28 have the same properties as those in the optical TLD reader 100. If a new convergence cone or silicon filter needs to be tested, they may be installed on the first supporting means 12. The heat lamp 24 to be tested is aligned with the convergence cone 26 by an index projection 25 and is held in place by an O-ring 27, lamp retaining ring 29, and retaining screws 31a, 31b. The connecting means 22 is connected to first and second electrical leads 30, 32. These leads may be connected to the lamp driver circuit in the TLD reader by connecting the leads 30, 32 to the TLD reader lamp power supply terminal block 112 which is shown in FIG. 2a, and, when so connected, are used to energize the heat lamp 24 to be tested. This allows the tested lamp to be subjected to the same voltage and timing conditions as it would experience when installed in the TLD reader 100. As will be seen later, this allows the operator to make various voltage and timing adjustments, if necessary, using the TLD reader controls, record those adjustments, and then correctly set the TLD reader when the test lamp 24 is installed for operation.

A fine gauge thermocouple 34 is attached to the heat absorbing substrate 16. In the preferred embodiment of this invention, the thermocouple 34 is in physical contact with the heat absorbing substrate 16 and is held in place by melting the element plate 14 directly under the thermocouple leads 36, 38 with a hot iron. FIG. 3 and FIG. 4 show a detail of this attachment. This provides a sufficient mechanical connection to support the thermocouple 34, as well as good heat transfer characteristics insuring that the thermocouple 34 truly senses the temperature of the substrate 16. Another method of attaching the thermocouple 34 to the heat absorbing substrate 16 is with a high temperature cement. If this method is used, one must insure that the heat transfer characteristics of the cement are sufficient to insure an accurate temperature reading by the thermocouple 34. The thermocouple 34 in the preferred embodiment is a chomel-alumel Type K thermocouple with a diameter of 0.003 inch or smaller. A Type K thermocouple with a diameter of 0.002 inch has been successfully used for this application. A Type K thermocouple is reliable over the temperature range of interest for this application. Other thermocouples may be used provided they are reliable over the appropriate temperature range.

Returning to FIG. 1, the output leads 36, 38 of the thermocouple 34 may be connected to a cold reference compensation circuit 40. This circuit is preferably included if one is to obtain an accurate temperature response. Optionally, the operator may calculate the cold reference coefficient manually. Cold reference compensation circuits are well known in the art. A suitable cold reference compensator circuit may be obtained from Omega Engineering, Inc. of Stamford, Connecticut. The output leads 42, 44 of the cold reference compensator circuit 40 are connected to a direct current amplifier 46 to amplify the thermocouple output to obtain a signal to drive the electronic processing components described below.

The amplified output of the thermocouple is connected to a processing means such as a display means 48. In the preferred embodiment this display means comprises a digital oscilloscope 48a. The display means 48 stores and records the output of the thermocouple 34, as well as other data, so that the operator may calibrate the test lamp 24. To insure accurate triggering of the display means, a trigger signal 50 is used as a second input to the display means. In the preferred embodiment, this trigger signal is generated by the TLD reader lamp driver circuit, and the second input of the display means 48 is attached to the TLD reader lamp voltage BNC connector 144 shown in FIG. 2b. Other triggers that may provide acceptable results are thermocouple voltage and the integrator gate voltage associated with the photomultiplier tube 110. The operation of the trigger will be explained in more detail below. The display means 48 may be connected to an output means 49 for data recording and/or manipulation. Connection between the display means 48 and the output means 49 may be by way of an RS-232C interface with a selectable baud rate or GPIB. For this application, GPIB is preferred. A personal computer or a printer may be used as an output means.

As stated above, the display means used in the preferred embodiment comprises a digital oscilloscope. FIG. 5 shows the major functional components of the oscilloscope 48a used in the preferred embodiment. An analog to digital (A/D) convertor 52 is connected to the output of the amplifier 46. For this application, the conversion time should not exceed 4 msec if loss of response resolution is to be avoided. The output of the A/D converter 52 is a digitized signal proportional to temperature. This digitized signal is one of several inputs to a data capture circuit 54. A second input to the data capture circuit is the trigger signal 50 discussed above. A manual reset 56 is a third input.

In the preferred embodiment, the data capture circuit 54 is programmable such that the delay time as well as the frequency may be varied. In the preferred embodiment, the data capture circuit 54 is triggered by voltage of the lamp driver circuit, and the circuit 54 digitizes a series of thermocouple measurements, one every 4 msec. During TLD reader operation, four flashes occur: a reference flash, a preheat flash 68a, a reading flash 68b and a post-heating flash 68c. To accurately record substrate temperature, information beginning with the pre-heat flash 68a is analyzed. For this reason, the data capture circuit 54 is programmed to trigger on the second rising edge of the lamp driver circuit. Data is recorded until the digitized temperature signal begins to decay following the post-heating flash 68c. Memory in the oscilloscope 48a retains information for a short time prior to trigger, thus insuring full data capture.

Once the trigger logic is satisfied, the digitized temperature signal is stored in a memory 58. In the preferred embodiment, the memory is a non-volatile random access memory (RAM) and consists of four storage registers, each capable of storing 500 data points. The digitized temperature signal is displayed on the oscilloscope screen 60 and may be transferred to the output means 49 such as a personal computer and/or a printer for analysis and data manipulation.

Figure 6:
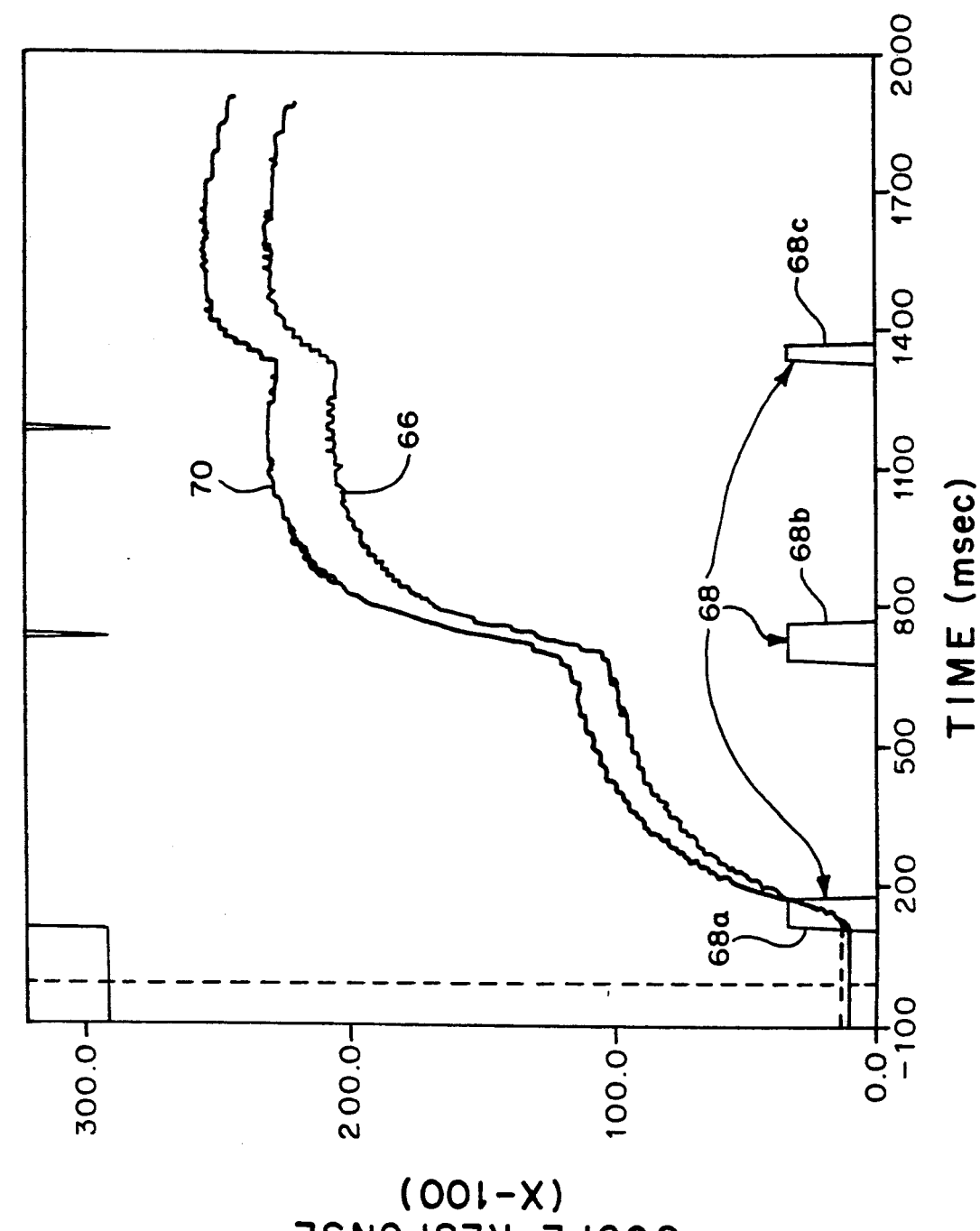
FIG. 6 is a graph showing an output heat response curve, a lamp driver circuit voltage curve and a 'standard' heat response curve.

The displayed output is in the form of a heat response curve 66 as shown in FIG. 6. The lamp driver circuit voltage 68 also may be output. As described below, the heat response curve of the test lamp is compared with a 'standard' heat response curve and adjustments are made until the curves overlie one another. To adjust the heat output of the test lamp 24 voltage and timing of the TLD lamp driver circuit are varied by adjusting voltage and timing parameters of the TLD reader 100.

In operation, the calibration and adjusting device can be used to calibrate a test lamp 24 and to adjust the heat output of the test lamp 24 in an accurate, fast and reliable manner. One preferred method for using the calibrating and adjusting device 10 includes the following steps:

Step 1: Turn off power to TLD reader 100 by turning key switch 102 off; remove the convergence cone 104 and cover the convergence cone opening 106 on the main housing 108. This is important to prevent damage to the photomultiplier tube 110.

Step 2: Connect the first and second electrical leads 30, 32 of the calibrating and adjusting device 10 to the TLD reader lamp power supply terminal block 112. Disconnect the lamp 114 if it is still in the TLD reader 100.

Step 3: Turn power back on to the TLD reader 100 by turning the key switch 102 to 'Badge Service'.
  A. If the TLD reader 100 reports an I4 or I5 error, turn off power immediately; do not open door until power is off. (I4 indicates a high dark count; I5 indicates a high reference element count).
  B. Recheck convergence cone opening 106 to be sure it is completely covered. Then turn power back on.

Step 4: Place the lamp 24 to be tested into the device 10 and connect it to the TLD reader 100 with the connecting means 22.

Step 5: Turn the key switch 102 of the TLD reader 100 to 'Reader Check Mode'. Depress the parameter key 116 twice. View the parameter display 118, and use the keyboard 120 to enter '0' for the element not being read and '1' for the element to be read. Insure that only one element is read to prevent damage to the heat absorbing substrate 16.

Step 6: Adjust the following parameters for proper initial heat response:
  A. Reduce P-OF to prevent excess heating of the thermocouple 34 during the reference element flash. Typical values are 50–100 msec.
  B. Extend P-10 to allow the thermocouple 34 to cool to near ambient temperature following the reference flash and prior to capturing the heat response curve. Typical values are 5000–9000 msec.
  C. Adjust P-56 if needed to prevent I5 error. A value of 1301 should prevent this error from occurring.

D. Adjust P-77L if needed to prevent I0 error. A per cent error value of 99 should prevent this error from occurring.

To modify these parameters:

a. Depress the parameter key 116 four times;

b. Use the keyboard 120 to enter '1', followed by the parameter number to be changed, followed by 'enter'; and c. Use the keyboard 120 to enter the new parameter followed by 'enter'.

Step 7: Capture one heat response curve 66:
 A. Trigger at the beginning of the pre-heat flash 68a;
 B. Stop after the post-heat response peak begins to decay.

Step 8: Store the captured heat response curve 66.

Step 9: Compare the stored heat response curve 66 with a 'standard' heat response curve 70 and adjust the voltage accordingly using the voltage adjusting potentiometer 140 located on the lamp driver board 142 Increase the voltage if the stored heat response curve 66 is below the 'standard' curve by turning the potentiometer 140 clockwise. Decrease the voltage if the stored heat response curve 66 is above the 'standard' curve by turning the potentiometer 140 counter-clockwise.

Step 10: Repeat Steps 7 thru 9 until the stored and 'standard' heat response curves 66, 70 match.

Step 11: If the heat response curve 66 cannot be matched with 'standard' curve 70 by using the voltage adjustment described above, adjust the timing parameters of the TLD reader 100 and then return to Step 7. The timing parameters are adjusted using the keyboard 120 to change the parameters P-01 and P-03 for calcium sulfate elements and the parameters P-46 and P-48 for lithium borate elements on a Panasonic TLD reader. Post-heating flash timing may be adjusted by varying the parameters P-06, P-08 and P-10. The procedure for making such changes is well known to those skilled in the art.

Step 12: Once a match is attained between the measured and 'standard' heat response curves 66, 70, the test lamp 24 produces the same amount of heat as the 'standard' lamp.

Step 13: If another lamp is to be tested, remove the first lamp 24 from the connecting means 22 and place the next lamp 24 to be tested into the connecting means 22.

Step 14: Change the timing parameters and voltage back to the original conditions.

Step 15: Proceed to Step 7.

Step 16: When all lamps have been tested, return the voltage and all changed parameters in the TLD reader 100 back to the correct settings for the lamp being used for daily use.

Step 17: Turn off power to the TLD reader 100 by turning the key switch 102 to 'Off', remove the convergence cone cover from the convergence cone opening 106, replace the convergence cone 104 and replace the correct lamp 114 into the main housing 108.

Step 18: Remove the first and second electrical leads 30, 32 from the TLD reader lamp power supply terminal block 112. Turn on power to the TLD reader 100 by turning the key switch to 'Badge Service'.

From the foregoing, it should be apparent that a calibrating and adjusting device and method have been described which accurately, reliably and quickly calibrate and adjust the heat output of a lamp used in an optical TLD reader. As pointed out above, new lamps may be quickly checked and calibrated and their voltage and timing parameter adjustments confirmed without the requirement of processing numerous samples exposed to known radiation sources.

The preferred embodiment described above has been developed for use with a conventional TLD reader 100. Because the lamp being calibrated and adjusted is mounted in the calibration and adjustment device 10, there is no need to alter the TLD reader 100, or to defeat any of the interlocks commonly provided in such a TLD reader to prevent damage to the photomultiplier tube.

Of course, it should be understood that a wide range of changes and modifications can be made to the preferred embodiment described above. The display means 48 may be replaced with other means for processing information correlated with substrate temperature. For example, a circuit may be provided to automatically adjust the lamp driver voltage and timing to cause the measured heat response curve to match the 'standard' heat response curve. Of course, other oscilloscopes or recording means may be substituted, and the entire device 10 can be adapted for use with another TLD reader. It is, therefore, intended that the foregoing detailed description be regarded as illustrative rather than limiting, and that it be understood that it is the following claims, including all equivalents, which are intended to define the scope of the invention.

I claim:

1. An apparatus for measuring output of a heat lamp of the type used in an optical TLD reader having a lamp driver circuit, said apparatus comprising:

a. an element plate comprising at least one heat absorbing substrate;

b. supporting means for supporting said element plate;

c. an optical system attached to said supporting means and configured to support a heat lamp and to direct light from said heat lamp onto said heat absorbing substrate;

d. connecting means for electrically connecting said heat lamp to a lamp driver circuit of an optical TLD reader of the type comprising means, separate from the supporting means, for supporting a radiation badge;

e. a thermocouple mounted in thermal contact with said heat absorbing substrate, wherein said thermocouple produces a first electrical signal related to temperature of said substrate;

f. data capture means responsive to said thermocouple for capturing said first electrical signal; and g. means, responsive to a signal derived from the first electrical signal, for processing information correlated with temperature of said substrate as a heat lamp calibration aid.

2. The apparatus of claim 1 further comprising a trigger circuit connected to said data capture means, wherein said trigger circuit causes the data capture means to capture said first electrical signal when said first electrical signal starts to increase.

3. The apparatus of claim 2 further comprising a cold reference compensator circuit connected between said thermocouple and said data capture means.

4. The apparatus of claim 1 wherein said data capture means and processing means comprise a digital oscilloscope.

5. The apparatus of claim 1 wherein said thermocouple is partially melted into said element plate for support of said thermocouple.

6. The apparatus of claim 1 wherein said thermocouple is secured in contact with said heat absorbing substrate with a high temperature cement.

7. The apparatus of claim 1 wherein the thermocouple is mounted on a side of the heat absorbing substrate facing the optical system.

8. The apparatus of claim 1 wherein said processing means comprises display means for displaying information correlated with temperature of said substrate.

9. The apparatus of claim 8 wherein said processing means further comprises conversion means, connected to said data capture means, for converting said first electrical signal to temperature for display by said display means.

10. An apparatus for calibrating a heat lamp used in an optical TLD reader having a lamp driver circuit and a first convergence cone, said optical TLD reader adapted to hold a first element plate comprising at least one first heat absorbing substrate, said apparatus comprising:
   a. a second element plate comprising at least one second heat absorbing substrate, said second element plate and said second heat absorbing substrate having selected substantially matched heat transfer characteristics with respect to said first element plate and said first heat absorbing substrate, respectively;
   b. supporting means for supporting said second element plate;
   c. a second convergence cone attached to said supporting means and adapted to support said heat lamp, said second convergence cone having selected substantially matched optical characteristics with respect to said first convergence cone, said heat lamp disposed such that said heat lamp faces said second heat absorbing substrate;
   d. connecting means for electrically connecting said heat lamp to said lamp driver circuit;
   e. a thermocouple positioned in thermal contact with said second heat absorbing substrate, wherein said thermocouple produces a first electrical signal related to temperature of said second substrate;
   f. data capture means, responsive to said thermocouple, for capturing said first electrical signal;
   g. conversion means, connected to said data capture means, for converting said first electrical signal to temperature; and
   h. display means, connected to said conversion means, for displaying temperature of said substrate.

11. The apparatus of claim 10 further comprising a trigger circuit connected to said data capture means, wherein said trigger circuit causes the data capture means to capture said first electrical signal when said first electrical signal starts to increase.

12. The apparatus of claim 11 further comprising a cold reference compensator circuit connected between said thermocouple and said data capture means.

13. The apparatus of claim 10 wherein said data capture means, said conversion means, and said display means comprise a digital oscilloscope.

14. The apparatus of claim 10 wherein said thermocouple is partially melted into said second element plate for support of said thermocouple.

15. The apparatus of claim 10 wherein said thermocouple is secured to said heat absorbing substrate with a high temperature cement.

16. The apparatus of claim 10 wherein the thermocouple is mounted on a side of said second heat absorbing substrate facing the second convergence cone.

17. A method for calibrating a heat lamp for an optical TLD reader comprising the following steps:
   a. providing an optical TLD reader adapted to hold a first element plate comprising at least one first heat absorbing substrate, said optical TLD reader comprising a lamp driver circuit and a first light collector;
   b. providing a heat lamp configured for use with the optical TLD reader;
   c. providing a lamp calibration device comprising:
      a second element plate comprising at least one second heat absorbing substrate;
      means for supporting said second element plate;
      an optical system attached to said supporting means and configured to support said heat lamp and to direct light from the heat lamp onto said second element plate;
      means for electrically connecting the heat lamp to the lamp driver circuit;
      a thermocouple mounted in thermal contact with said second heat absorbing substrate to produce a first electrical signal related to temperature of said second heat absorbing substrate;
   d. mounting the heat lamp in the optical system of the lamp calibration device;
   e. connecting the heat lamp to the lamp driver circuit of the optical TLD reader;
   f. using the lamp driver circuit to drive the heat lamp while monitoring the first electrical signal to measure output of the heat lamp; and
   g. adjusting the lamp driver circuit to enhance correspondence between output of the heat lamp as measured in step (f) and a reference output.

18. The method of claim 17 wherein step (f) comprises the following steps:
   f1. capturing the first electrical signal;
   f2. converting said first electrical signal to a temperature signal; and
   f3. displaying said temperature signal.

19. The method of claim 17 wherein the lamp calibration device provided in step (c) has the thermocouple mounted to a side of the second heat absorbing substrate facing the optical system.

* * * * *